US007388813B2

(12) United States Patent
Su

(10) Patent No.: US 7,388,813 B2
(45) Date of Patent: Jun. 17, 2008

(54) TIME DISPLAY DEVICE

(75) Inventor: Hwa Su, Ping Cheng (TW)

(73) Assignee: Intematix Technology Center Corp., Taoyuan County (TW)

( * ) Notice: Subject to any disclaimer, the term of this patent is extended or adjusted under 35 U.S.C. 154(b) by 177 days.

(21) Appl. No.: 11/236,503

(22) Filed: Sep. 28, 2005

(65) Prior Publication Data

US 2006/0262653 A1 Nov. 23, 2006

(30) Foreign Application Priority Data

May 17, 2005 (TW) .............................. 94207984 U

(51) Int. Cl.

| | |
|---|---|
| ***G04B 19/00*** | (2006.01) |
| ***G04C 17/02*** | (2006.01) |
| ***F21V 9/00*** | (2006.01) |
| ***G01D 11/28*** | (2006.01) |

(52) U.S. Cl. ........................ 368/79; 368/241; 362/231; 362/27; 362/29

(58) Field of Classification Search .................. 368/79, 368/62, 226–227, 234, 238, 239–242, 223, 368/81; 362/800, 231, 23, 27–29
See application file for complete search history.

(56) References Cited

U.S. PATENT DOCUMENTS

| | | | | |
|---|---|---|---|---|
| 2,290,278 | A * | 7/1942 | Failla | 368/234 |
| 3,430,433 | A * | 3/1969 | Sandor | 368/80 |
| 3,983,688 | A * | 10/1976 | Kockinos | 368/24 |
| 4,034,549 | A * | 7/1977 | Danley et al. | 368/79 |
| 4,692,033 | A * | 9/1987 | Mock et al. | 368/280 |
| 4,761,715 | A * | 8/1988 | Brooks | 362/23 |
| 6,160,767 | A * | 12/2000 | Ho | 368/79 |
| 6,182,601 | B1 * | 2/2001 | Baatz | 116/288 |
| 6,299,321 | B1 * | 10/2001 | Fuwausa | 362/29 |
| 6,690,623 | B1 * | 2/2004 | Maano | 368/82 |
| 2003/0206494 | A1 * | 11/2003 | Haupt et al. | 368/79 |
| 2006/0133215 | A1 * | 6/2006 | Gordon et al. | 368/79 |

* cited by examiner

*Primary Examiner*—Paula A. Bradley
*Assistant Examiner*—Sean Kayes
(74) *Attorney, Agent, or Firm*—Rosenberg, Klein & Lee

(57) ABSTRACT

A time display device which utilizes light beams to display time is disclosed. The time display device at least comprises a timetable panel, an illuminant module, a counter unit, and a control unit. When the counter unit sends a counting result to the control unit, the control unit controls the illuminant module to respectively emit three color light beams projected on the timetable panel through the shielding of at least one shielding structure to form three color image areas with different distances to represent a second, a minute and a hour corresponding to the counting result.

13 Claims, 6 Drawing Sheets

TIME DISPLAY DEVICE

FIELD OF THE INVENTION

The present invention relates to a time display device, and more particularly, a time display apparatus utilizing a light source module projecting light beams on a timetable panel to show the present time.

BACKGROUND OF THE INVENTION

As time passed, the exhibition of displaying time becomes a great of diversities. People try to know the present time through various ways. At the beginning, there were primitive sundials, sandglasses, then mechanical clocks, and now digital clocks or watches.

In FIG. 1, it is a perspective diagram showing the structure of the main body portion of a clock in the prior art. The main body portion of the clock in FIG. 1 comprises a timetable panel 12, at least one pointer 13 positioned above the timetable panel 12, and a time display housing 11 containing the timetable panel 12 and the pointer 13 wherein the pointer 13 contains at least one hour pointer 14, one minute pointer 15 or one second pointer 16. The length of the hour pointer 14 is shorter than that of the minute pointer 15, and the thickness of the second pointer 16 is thinner than that of the minute pointer 15 wherein the combinations of these pointers have various forms to show the time information.

In the early stage, the pointers can not be seen in the dark. However, with modifications made by people, the combinations of the pointers can be seen in the dark as the example represented in FIG. 2 which includes a perspective diagram and a dissection diagram showing the structure of the main body portion of a clock able to show time information in the dark in the prior art. The time display main body in FIG. 1 housing a timetable panel 12 and a pointer 13 positioned above the timetable panel 12. In the cooperation with the time display device structure in FIG. 1, adding florescent materials 21 into the pointer 13 to form a pointer 22 containing florescent materials 21. Furthermore, the pointer 22 contains an hour pointer 23, a minute pointer 24 and a second pointer 25 wherein the length of the hour pointer 23 is shorter than that of the minute pointer 24, and the thickness of the second pointer 25 is thinner than that of the hour pointer 23 and that of the minute pointer 24. With the florescent pointers 22, the time information can be seen in the dark. However, the time period of light emitting is only temporary and limited by the characteristics of florescent materials. After a while, the light emitted from the pointers vanishes and becomes one of the disadvantages of the clocks utilizing the florescent materials. Moreover, the annoying tick of clocks or watches is another disadvantage of clocks or watches with pointers.

It is an objective of the present invention utilizing at least one illuminant module projecting light beams on a timetable panel to show the present time to overcome the disadvantages of the examples in prior art including the light vanishment of florescent materials and the annoying sounds from the pointers of clocks.

SUMMARY OF THE INVENTION

The present invention provides a time display device comprising at lease one timetable panel, one illuminant module, one counter unit and one control unit. The timetable panel can be a concave panel with a center area, and the control unit can be positioned under the timetable panel. The counter unit can be positioned on the control unit to send a counting result to the control unit. The illuminant module has three light emitting elements that are arranged in a vertical sequential order. Wherein while receiving the counting result, the control unit controls the three light emitting elements to respectively emit three color light beams projected on the concave panel through the shielding of at least one shielding structure to form three color image areas with different distances to represent a second, a minute and a hour corresponding to the counting result.

The features and advantages of the present invention are further described by referring to the descriptions of the embodiments and the details with accompanying drawings.

DETAILED DESCRIPTION OF THE PREFERRED EMBODIMENTS

Figure 1:
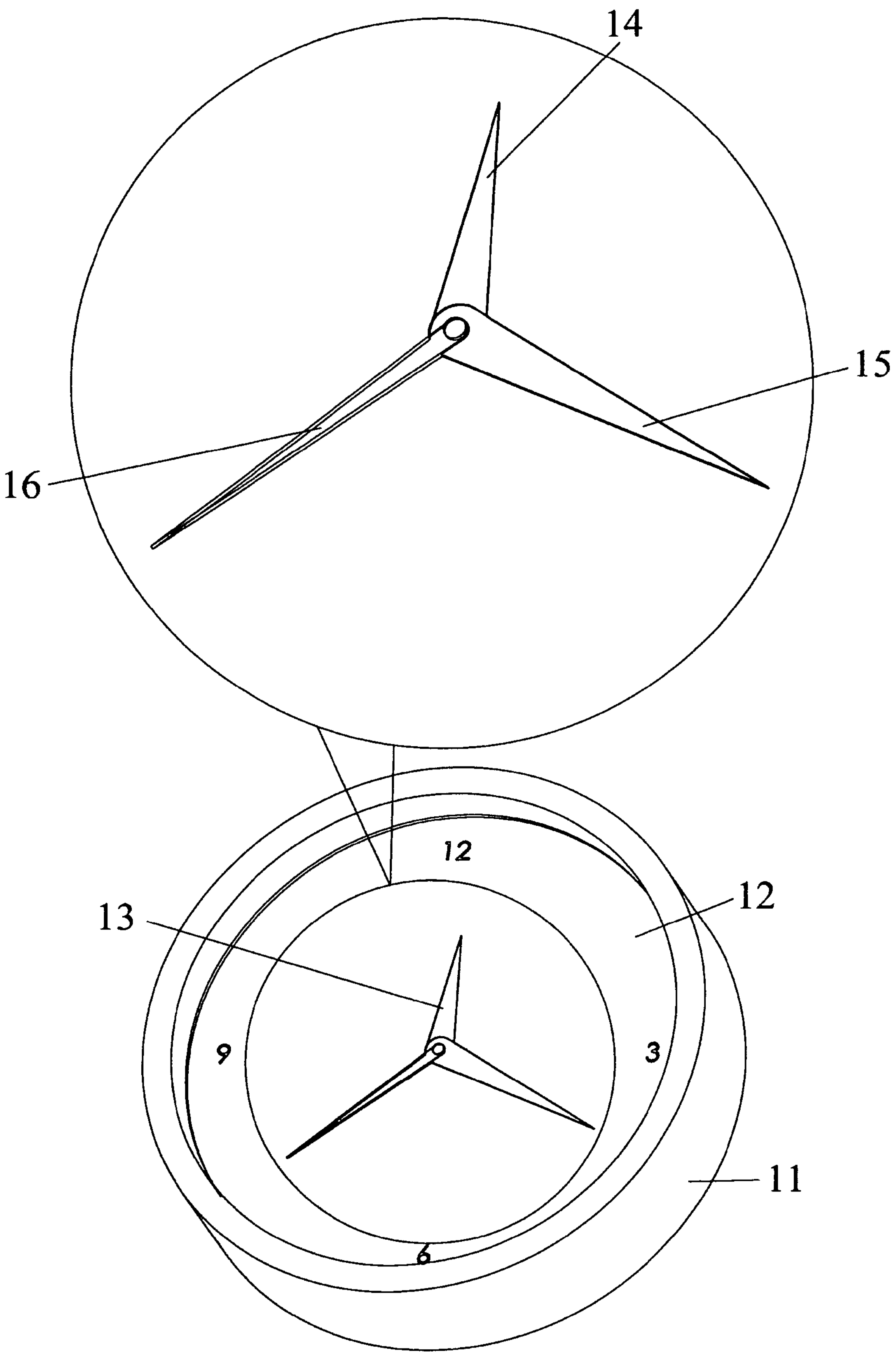
FIG.1 (PRIOR ART)
FIG. 1 is a perspective diagram showing the structure of the main body portion of a clock in the prior art.
Figure 2:
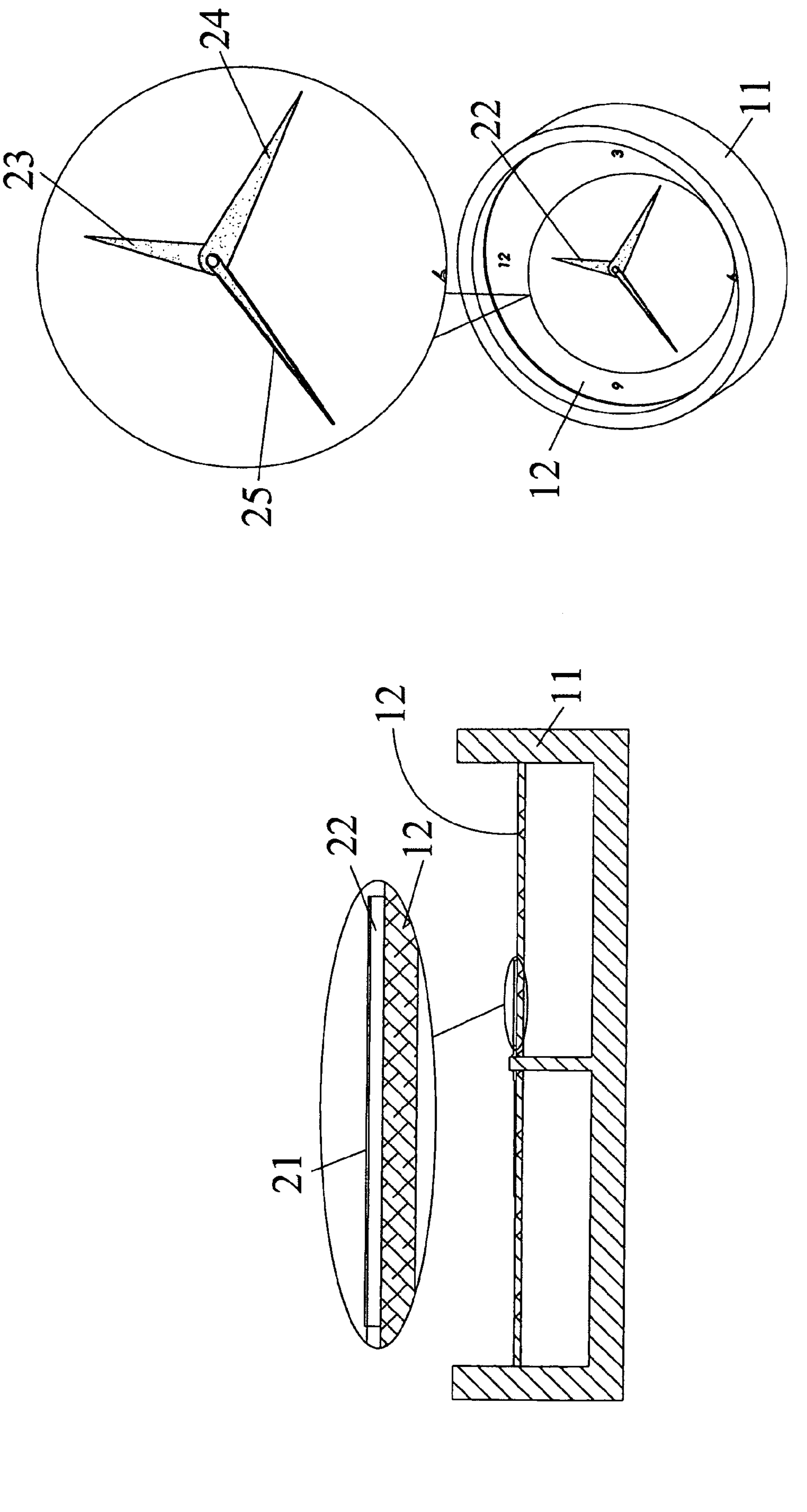
FIG.2 (PRIOR ART)
FIG. 2 includes a perspective diagram and a dissection diagram showing the structure of the main body portion of a clock able to show time information in the dark in the prior art.
Figure 3:
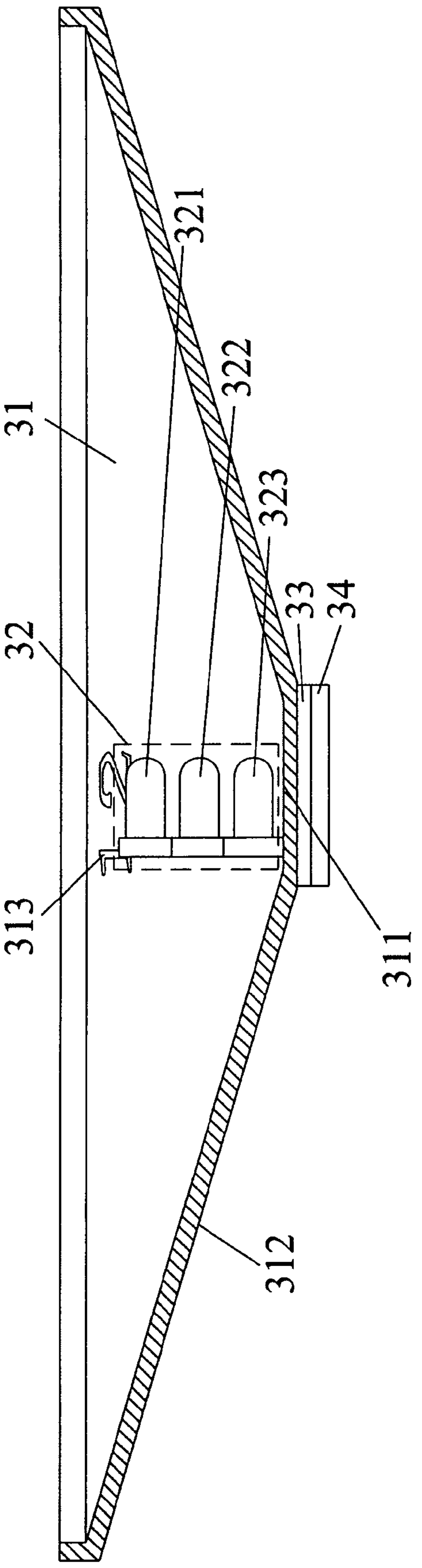
FIG. 3 is a dissection diagram of a time display device according to one embodiment of the present invention.
Figure 4:
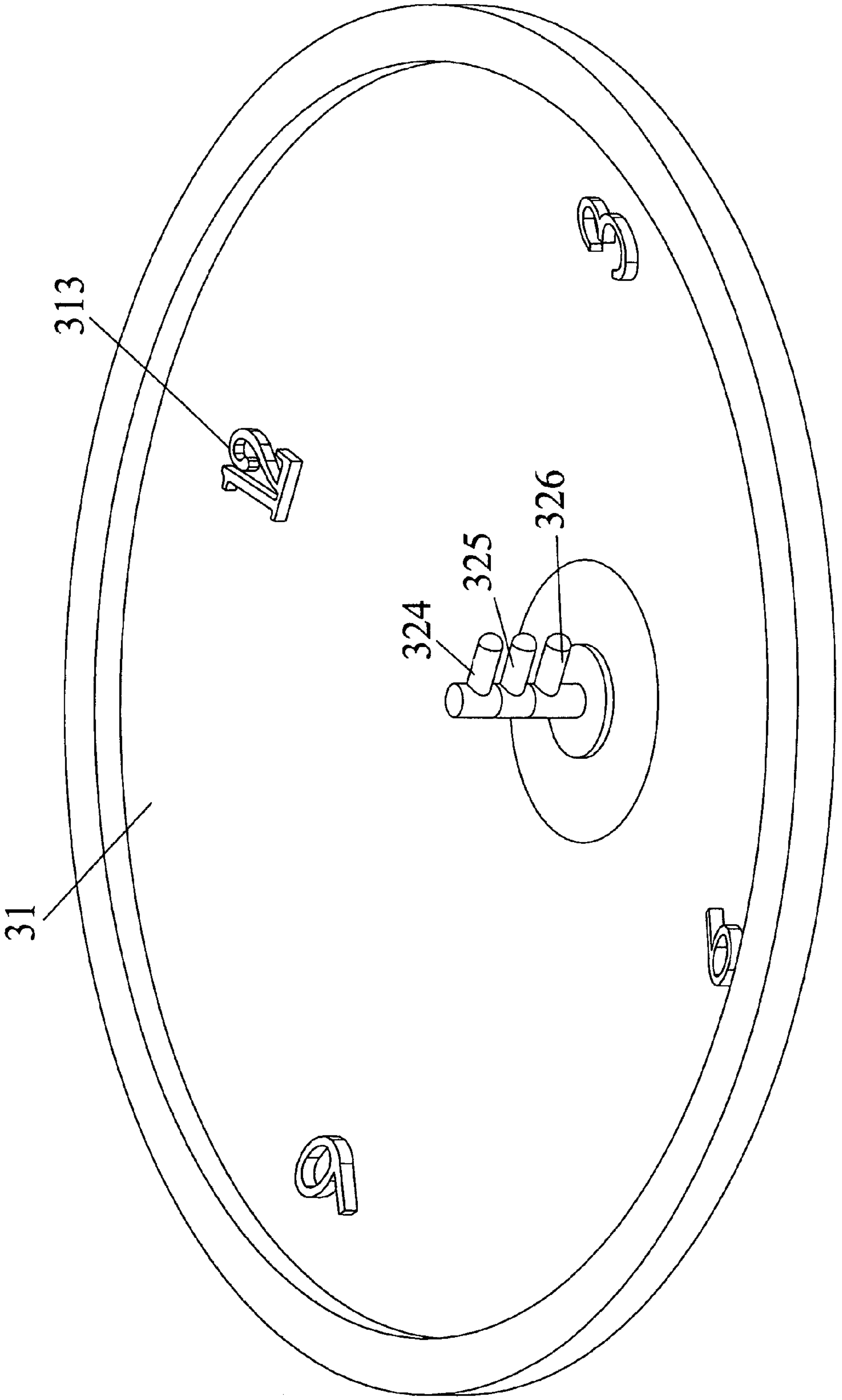
FIG. 4 is a perspective diagram of a time display device according to one embodiment of the present invention.

FIG. 3 is a dissection diagram of a time display device according to one embodiment of the present invention. The embodiment comprises at least one timetable panel 31, one illuminant module 32, one counter unit 33 and one control unit 34. The timetable panel 31 may be a concave panel 312 with a circular or polygon board on which numerical digits can be carved for timing indicators 313. The timetable panel 31 further includes a center area 311 which is a flat bottom of the concave timetable panel 31. Moreover, the illuminant module 32 is a light emitting diode (LED) module emitting at least one light beam with a specific color. The illuminant module 32 illustrated in FIG. 3 further comprises three colorful light sources for representing the hour, minute, and second of time by red, blue and green of primary colors or by yellow, purple, dark green or magenta of subtractive primary colors. At least one shielding structure 324, 325, 326 covers the LED module to prevent color light beams generated by three light emitting elements of the illuminant module 32 from interfering with each other, thereby producing specific beam directions. The location of the illuminant module 32 is positioned at the center area 311 of the timetable panel 31. Furthermore, the counter unit 33 used for counting the real time can be included in the control unit 34 comprising a integrated circuit (IC) positioned on a printed circuit board (PCB). The control unit 34 positioned under the center area 311 of the timetable panel 31 controls the illuminant module 32 to display at least three figures showing the real time by emitting at least three light beams on the timetable panel 31. FIG. 4 is a top perspective diagram of an embodiment illustrated in FIG. 3.

Figure 5:
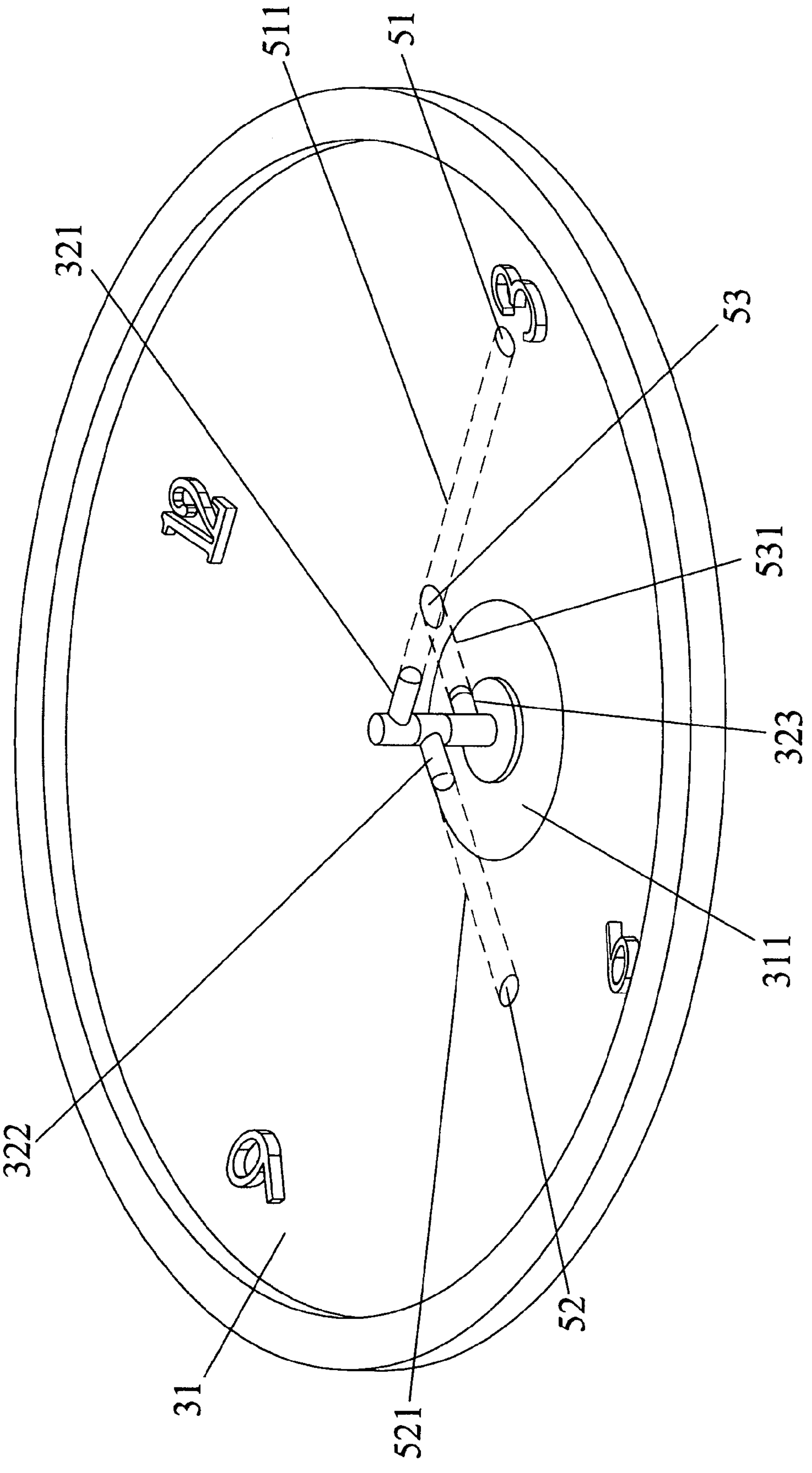
FIG. 5 illustrates the operation of a time display device according to one embodiment of the present invention.

In FIG. 5, it illustrates the operation of a time display device according to one embodiment of the present invention controlling the illuminant module 32 by using the control unit 34 described in FIG. 3. The illuminant module 32 can be an LED module including at least three different color LEDs in which there are a red LED 321 emitting a red light beam, a blue LED 322 emitting a blue light beam and a green LED 323 emitting a green light beam positioned at the center area 311 in a vertical sequential order. For example, the LED 321 emitting a red light beam can be positioned at the top of the module, the LED 322 emitting a blue light beam can be positioned at the middle of the module and the LED 323 emitting a green light beam can be positioned at the bottom of the module. While the counter unit 33 in FIG. 3 sends the counting result to the control unit 34, i.e. the time is 5 hours, 50 minutes and 10 seconds, the control unit 34 controls the illuminant module 32 wherein the top red LED 321 emits a light beam on the concave timetable panel 31 having the direction of the dashed line 511 as illustrated in FIG. 5 and having a red image area 51 located between the numerical digits "12" and the numerical digit "3". The red image area 51 represents the second portion of time in order to display the 10 seconds portion of the time of 5 hours, 50 minutes and 10 seconds. The middle blue LED 322 emits a light beam on the concave timetable panel 31 having the direction of the dashed line 521 as illustrated in FIG. 5 and having a blue image area 52 located between the numerical digits "12" and the numerical digit "9". The blue image area 52 represents the minute portion of time in order to display the 50 minutes portion of the time of 5 hours, 50 minutes and 10 seconds. Furthermore, the lowest green LED 323 emits a light beam on the concave timetable panel 31 having the direction of the dashed line 531 as illustrated in FIG. 5 and having a blue image area 53 located at the numerical digit "6". The green image area 53 represents the hour portion of time in order to display the 5 hours portion of the time of 5 hours, 50 minutes and 10 seconds. Thus, there are three images located at three portions of timetable panel 31 with different distances from center point to represent the hours, minutes, and seconds of time.

Figure 6:
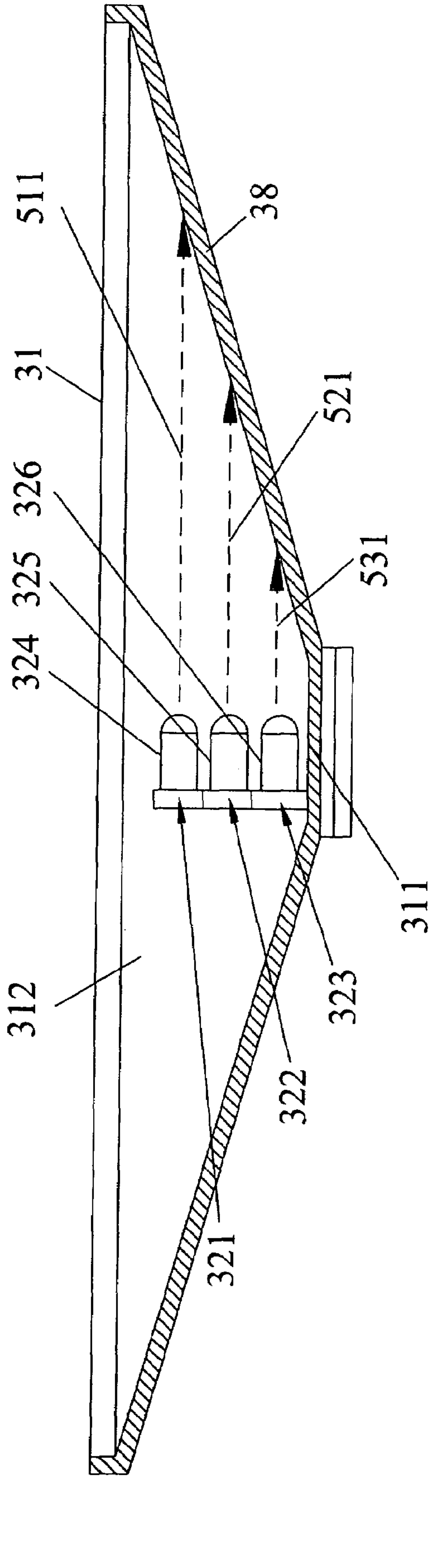
FIG. 6 is a dissection diagram of a time display device according to one embodiment of the present invention illustrating the displaying operation utilizing illuminant modules and a timetable panel.

The embodiment in FIG. 5 utilizing three light beams represent hour, minute and second respectively to display time wherein the red LED 321 of the illuminant module 32 emits a light beam 511 with the longest distance, the blue LED 322 emits a light beam 521 with a shorter distance, and the green LED 323 emits a light beam 531 with a shortest distance. The light beams 511, 521, 531 further project three images 51, 52, 53 with different colors resulted from the reflection of the light beams from the illuminant module 32 by the concave timetable panel 31. Referred to FIG. 6, it is a dissection diagram of a time display device according to one embodiment of the present invention illustrating the displaying operation utilizing light projecting sources and a timetable panel. According to the concave shape of the timetable panel 31 and the flat shape of the center area 311 of the timetable panel 31, the timetable panel 31 has a funnel-like shape 38 with a wide board and a narrow area. Moreover, there is a ramp area 312 coupling the wide boarder and the narrow area. The red LED 321, positioned at the highest portion of the illuminant module 32 located at the center area 311 of the timetable panel 31 corresponding to the top portion of the ramp area 312 of the concave timetable panel 31, emits a red light beam projecting a red image area 51 with a longest distance 511 on the top portion of the ramp area 312. The blue LED 322, positioned at the lower portion of the illuminant module 32 located at the center area 311 of the timetable panel 31 corresponding to the middle portion of the ramp area 312 of the concave timetable panel 31, emits a blue light beam projecting a blue image area 52 with a shorter distance 521 on the middle portion of the ramp area 312. Furthermore, the green LED 323, positioned at the lowest portion of the illuminant module 32 located at the center area 311 of the timetable panel 31 corresponding to the lowest portion of the ramp area 312 of the concave timetable panel 31, emits a green light beam projecting a green image area 53 with a shortest distance 531 on the lowest portion of the ramp area 312. A representation of time information can be displayed with these colorful image areas with different distances.

Through the solutions indicated by the embodiments of the present invention for providing various styles representing time information, the vanishment problem of the clocks with fluorescent materials indicating the timing and the annoying sounds of the clocks with pointers can be both solved. Although the features and advantages of the embodiments according to the preferred invention, it is not limited to the embodiments described above, but encompasses any and all modifications and changes within the spirit and scope of the following claims.

What is claimed is:

1. A time display device, comprising:

a timetable panel being a concave panel having a center area;

an illuminant module having three light emitting elements, and the three light emitting elements arranged in a vertical sequential order;

a control unit positioned under the timetable panel;

a counter unit positioned on the control unit, and for sending a counting result to the control unit; and wherein while receiving the counting result, the control unit controls the three light emitting elements to respectively emit three color light beams projected on the concave panel through the shielding of at least one shielding structure to form three color image areas with different distances to represent a second, a minute and a hour corresponding to the counting result.

2. The time display device according to claim 1, wherein the timetable panel is carved with timing indicators.

3. The time display device according to claim 1, wherein the illuminant module is a LED module.

4. The time display device according to claim 1, wherein the shielding structure prevents color light beams of the illuminant module from interfering with each other.

5. The time display device according to claim 1, wherein the counter unit and the control unit are positioned beneath the center area of the timetable panel.

6. The time display device according to claim 1, wherein the three light emitting elements are respectively a red LED, a blue LED and a green LED.

7. The time display device according to claim 1, wherein the counting result is a real time.

8. The time display device according to claim 1, wherein the vertical sequential order is that the three light emitting elements are respectively positioned at the top of the illuminant module, at the middle of the illuminant module and the bottom of the illuminant module.

9. The time display device according to claim 1, wherein the three light emitting elements further include a yellow LED, a purple LED and a magenta LED.

10. The time display device according to claim 1, wherein the different distances are that the three color light beams projected on the concave panel respectively have a longest distance, a shorter distance and a shortest distance to represent the second, the minute and the hour.

11. The time display device according to claim 1, wherein the three color image areas includes a red image area, a blue image area and a green image area.

12. The time display device according to claim 1, wherein the timetable panel has a funnel-like shape with a wide board and a narrow area.

13. The time display device according to claim 12, wherein the wide board and the narrow area are formed a ramp area, and three color image areas are respectively projected on a top portion of the ramp area, a middle portion of the ramp area and a lowest portion of the ramp area.

* * * * *